United States Patent [19]

Asami et al.

[11] 4,174,426

[45] Nov. 13, 1979

[54] METHOD OF IMPROVING CHARACTERISTIC OF CATION-EXCHANGE MEMBRANE BY SWELLING IN WATER MISCIBLE ORGANIC SOLVENT AND TREATING FURTHER WITH HYDROCHLORIC ACID

[75] Inventors: Shunichi Asami; Toru Seita; Akihiko Shimizu, all of Shin-nanyo, Japan

[73] Assignee: Toyo Soda Manufacturing Co., Ltd., Yamaguchi, Japan

[21] Appl. No.: 913,364

[22] Filed: Jun. 7, 1978

[30] Foreign Application Priority Data

Jun. 13, 1977 [JP] Japan ................................. 52-68883

[51] Int. Cl.$^2$ ...................... B01D 15/04; C08F 14/18; C08J 5/22
[52] U.S. Cl. ........................................ 521/27; 521/30; 521/31; 525/331
[58] Field of Search ................. 521/27, 30, 31; 526/18

[56] References Cited

U.S. PATENT DOCUMENTS

| | | | |
|---|---|---|---|
| 3,684,747 | 8/1972 | Coalson et al. | 521/27 |
| 3,843,617 | 10/1974 | Orlov et al. | 526/42 |

FOREIGN PATENT DOCUMENTS 929970  6/1963  United Kingdom ..................... 526/18

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A homogeneous cation-exchange membrane made of one or more fluorinated polymer having cation-exchangeable groups is swollen with a water miscible organic solvent and then the solvent is removed from the swollen membrane and then membrane is treated with hydrochloric acid.

The cation-exchange membrane of the fluorinated polymer having cation-exchangeable groups is modified to reduce the permeability of hydroxyl group ions by swelling it and removing the water-miscible organic solvent and then, treating it with hydrochloric acid.

10 Claims, No Drawings

METHOD OF IMPROVING CHARACTERISTIC OF CATION-EXCHANGE MEMBRANE BY SWELLING IN WATER MISCIBLE ORGANIC SOLVENT AND TREATING FURTHER WITH HYDROCHLORIC ACID

BACKGROUND OF THE INVENTION

The present invention relates to a method of improving characteristics of a cation-exchange membrane. More particularly, it relates to a method of improving characteristics in an electrolysis of an electrolyte by a cation-exchange membrane in an aqueous solution having hydroxyl group ions which comprises swelling a homogeneous cation-exchange membrane with a water-miscible organic solvent to reduce the permeability of hydroxyl group ions and removing the water-miscible organic solvent and treating it with hydrochloric acid.

Heretofore, the cation-exchange membranes have been used in a concentration of an alkali hydroxide by an electrodialysis in an electrolysis of an aqueous solution of sodium sulfate and in a demineralization of brine or sea water for producing fresh water and they also used as a diaphragm for an electrolysis of sodium chloride.

The following characteristics are required for the cation-exchange membrane.

(1) high cation transport number of the membrane
(2) low electric resistance of the membrane
(3) high chemical stability
(4) high mechanical strength Cation-exchange membranes of fluorinated polymer having sulfonic acid groups such as Nafion (E. I. Dupont) have been well-known as cation-exchange membranes which are practically used.

The cation-exchange membranes have satisfactory characteristics of (3) and (4) but do not have satisfactory characteristics of (1) and (2).

The inventors have studied the development of the cation-exchange membranes having satisfactory characteristics of (1) and (2), and have found the cation-exchange membranes of fluorinated polymer having cation-exchangeable groups which have excellent characteristics.

Many methods of improving characteristics of cation-exchange membranes in various uses by reducing permeability of hydroxyl group ions have been proposed. (Japanese Unexamined Patent Publication Nos. 44360/1973, 66488/1975, 105581/1975, 108182/1975 and 120492/1975, etc.)

In these methods, the chemical structure of a part or whole of the membrane are modified or another polymer is combined or special ion-exchangeable groups are formed. They are substantially different from the method of the invention.

In these methods, it may be difficult to recover a membrane whose functional characteristic is deteriorated by the application. In accordance with the method of the present invention, the cation-exchange membrane can be easily recovered to the initial characteristic or higher.

A treatment of an ion-exchange membrane with an organic solvent is disclosed in Japanese Unexamined Patent Publication No. 158590/1975.

The ion-exchange membranes described in the specification are heterogeneous type ion-exchange membranes having a hydrocarbon type polymer which is electrically inactive bonding substrate or a net structure polymer. Accordingly, the membranes are quite different from the cation-exchange membrane which can not impart the effect of the present invention and the treatment is quite different. Accordingly, the concept and effect of the present invention are clearly different from those of Japanese Unexamined Patent Publication No. 158590/1975.

When the cation-exchange membranes of fluorinated polymer are treated, the effects of the present invention will be expected.

SUMMARY OF THE INVENTION

It is an object of the present invention to provide a method of improving characteristics in an electrical separation or concentration by using a homogeneous cation-exchange membrane under reducing permeability of hydroxyl group ions without deteriorating the other characteristics of the membrane.

The foregoing and other objects of the present inventions have been attained by swelling a homogeneous cation-exchange membrane of a fluorinated polymer with a water-miscible organic solvent and then removing the solvent from the membrane by a specific manner, and treating the membrane with hydrochloric acid.

DETAILED DESCRIPTION OF THE PREFERRED EMBODIMENTS

The method of the present invention can be effectively applied for treating a cation-exchange membrane used as a diaphragm in an electrolysis of sodium chloride. For example, in the production of sodium hydroxide in a diaphragm type electrolytic cell using a cation-exchange membrane by electrolyzing under feeding an aqueous solution of sodium chloride into the anode compartment to obtain 20 wt.% aqueous solution of sodium hydroxide, it is possible to improve 5 to 10% of current efficiency based on sodium hydroxide in comparison with that using the non-treated cation-exchange membrane.

The application of the invention is not limited to this case but it can be the application by treating the cation-exchange membrane in various fields in which high permeability of hydroxyl group ions to the cation-exchange membrane is not desired such as a concentration of alkali metal hydroxide by an electrodialysis and a production of sodium hydroxide and sulfuric acid by an electrolysis of sodium sulfate, etc..

The cation-exchangeable groups in the cation-exchange membrane can be acid type or salt type depending upon the condition using the cation-exchange membrane.

The method of the invention is effective for both types. When the cation-exchangeable groups are in the salt type, the effect is especially higher than that of the acid type.

The fact shows that the method of the invention is not only effective for improving current efficiency of a new cation-exchange membrane but also is effective for recovering a cation-exchange membrane having low current efficiency used in an aqueous solution of electrolytes for a long period to improve the characteristics of the membrane to the original characteristics or higher.

The effect of the invention by treating the salt type cation-exchange membrane is also one of the important feature of the invention.

The cation-exchange membrane used as a diaphragm for an electrolysis of sodium chloride is expensive and the cost of the membrane is at high ratio of the cost for producing sodium hydroxide by a cation-exchange membrane method.

In accordance with the treatment of the invention, the cation-exchange membrane can be repeatedly used in economical advantages.

The method of the invention is simple. The cation-exchange membrane is dipped into a water miscible solvent to swell the membrane with the solvent and then the solvent is removed from the membrane.

The dipping time is dependent upon the swelling property of the membrane to the water miscible solvent and it is preferably longer. When the swelling property by the water miscible solvent is high, the dipping time can be several tens minutes and the solvent can be heated for promoting the swelling property.

The swelling degree of the cation-exchange membrane by the water miscible solvent can be about 3%, but is preferably more than 5% as the percent of a weight gain of the membrane by swelling to a non-treated dry membrane.

The water miscible solvent immersed in the membrane in the swelling step is removed by drying under an atmospheric pressure or a reduced pressure.

The main characteristics of the present invention are as follows.

1. The characteristics of the known cation-exchange membranes can be significantly improved by a simple and economical method.

The electric resistance of the membrane can be reduced without decreasing the cation transport number of the original membrane or under increasing the cation transport number or it can be maintained under increasing the cation transport number.

2. There are two kinds of cation-exchange membranes in acid type and salt type. The treatment of the present invention is effective for both kinds of the cation-exchange membranes.

3. The method of improving characteristics of the present invention is significantly effective for the cation-exchange membranes whose characteristics are deteriorated by a long operation in an aqueous solution of an electrolyte or by various troubles except mechanical trouble during the operation.

The cation-exchange membrane used as the diaphragm for an electrolysis of sodium chloride is usually expensive. Accordingly, the method of the present invention is significantly effective from the economical viewpoint.

4. It is necessary to have high chemical resistance and heat resistance and mechanical resistance together with the improved characteristics of the cation-exchange membrane as a diaphragm for an electrolysis of sodium chloride.

These properties are not deteriorated by the treatment of the present invention.

The homogeneous cation-exchange membranes are different from the non-homogeneous cation-exchange membranes containing the bonding material or the other inactive polymer which has no cation-exchangeability in a micro-net structure. Thus, the homogeneous cation-exchange membrane can be reinforced with a fabric for increasing the mechanical strength of the membrane.

The cation-exchange groups of the fluorinated polymers used in the invention can be sulfonic acid group, carboxylic acid group or salts thereof.

The cation-exchange groups on or near the surface of the homogeneous cation-exchange membrane can be functional groups which can be converted to sulfonic acid groups or carboxylic acid groups.

The cation-exchange groups in a cation-exchange membrane can be destroyed by means of a chemical treatment to form an electrically inactive surface layer.

Typical fluorinated polymers having cation-exchangeable groups having the following units. The units may have groups which can be converted into cation-exchangeable groups.

(A) Sulfonic Acid Type Fluorinated Polymers

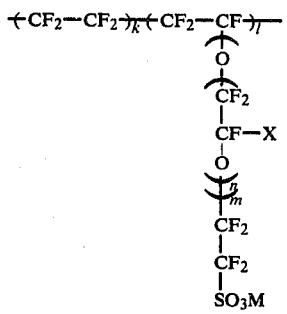

X = CF$_3$, —CF$_2$—O—CF$_3$;
n = 0 or 1 to 5;
m = 0 or 1;
k/l = 3–16 preferably 5–13.
M = H, NH$_4$, or alkali metal such as Na, K.
such as;

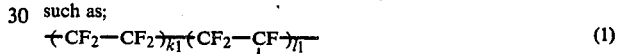 (1)

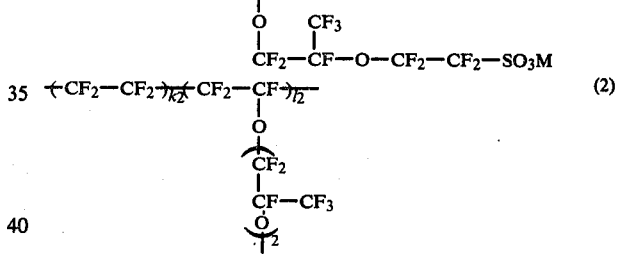 (2)

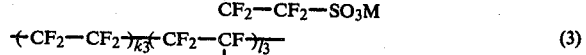 (3)

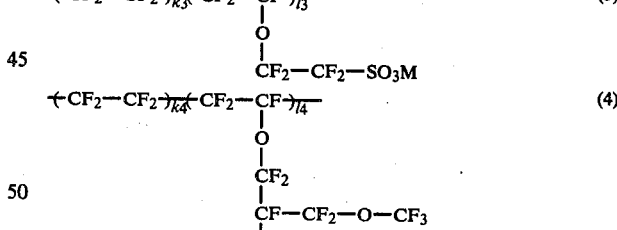 (4)

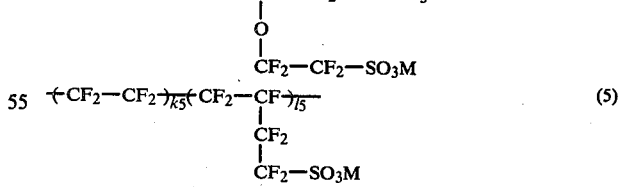 (5)

The copolymer preferably contains sulfonic acid groups in a ratio of one per 700 to 2800 of molecular weight.

(B) Carboxylic Acid Type Fluorinated Polymers

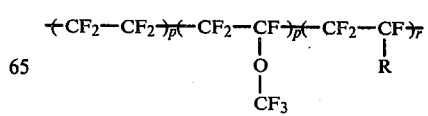

R represents
A,

-continued $-O(CF_2)_aA,$ $-O(CF_2-CF-O)_b-(CF_2)_cA$ or
$\qquad\qquad\quad|$
$\qquad\qquad CF_3$ $(CF_2)_cA.$ a = 2 to 4;
b = 0 or 1 to 5;
c = 1 to 5;
A = —COOM; M: H, or alkali metal such as Na, K.
(p + q)/r = 0.5-19 preferably 1-10.

such as;

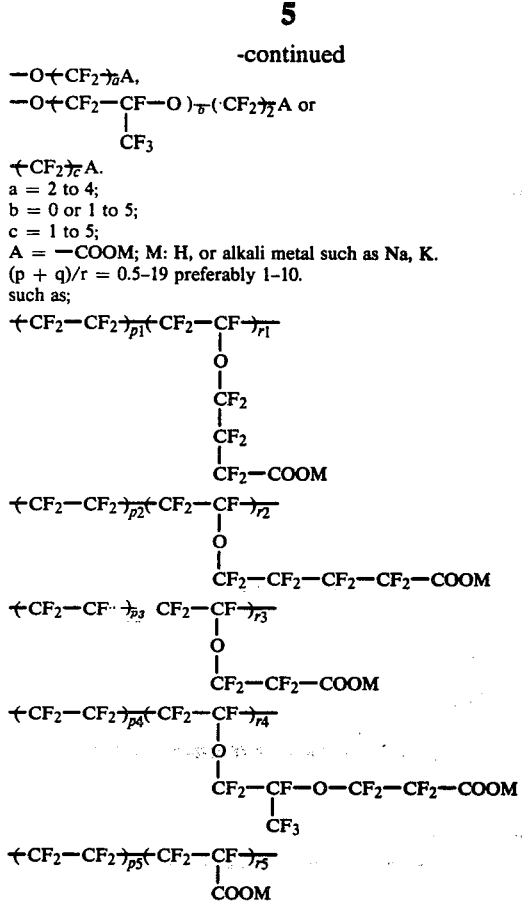

-continued

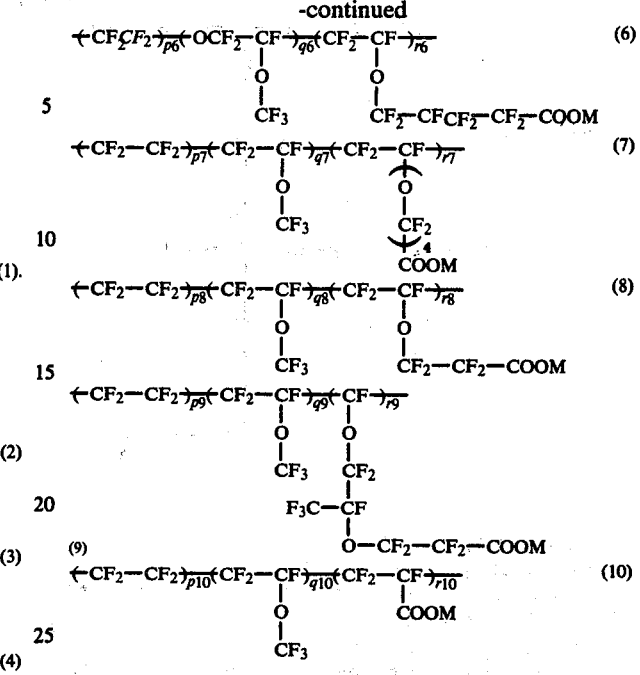

The copolymer preferably contains carboxylic groups in a ratio of one per 220 to 2700 of the molecular weight.

(C) Sulfonic Acid and Carboxylic Acid Type Fluorinated Polymers

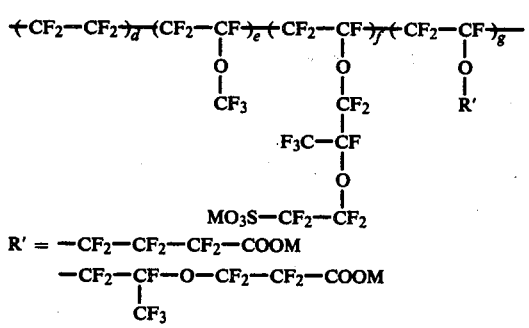

$R' = -CF_2-CF_2-CF_2-COOM$ $\qquad -CF_2-CF-O-CF_2-CF_2-COOM$
$\qquad\qquad\;\;|$
$\qquad\qquad CF_3$ M = H, or alkali metal such as Na, K.
(d + e)/f = 0.5-17 preferably 1-13;
(d + e)/g = 0.3-14 preferably 0.8-8;
f/g = 0.2-2.2 preferably 0.25-1.8.

such as;

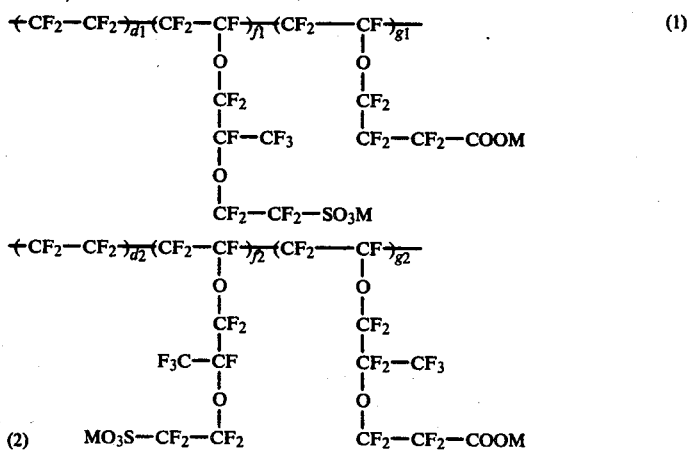

-continued

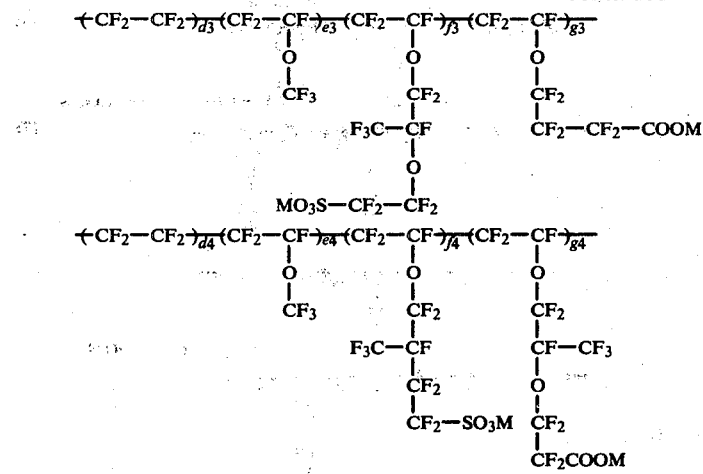

The copolymer preferably contains sulfonic acid groups in a ratio of one per 700 to 4300 of the molecular weight and carboxylic groups in a ratio of one per 480 to 2600 of the molecular weight.

These examples of the units for the fluorinated polymers having cation-exchangeable groups are only schematic illustrations and the combinations of the units can be determined by the copolymerization ratio of the monomers.

The typical monomers are as follows:

Monomers having a cation-exchangeable group or a functional group which can be converted to a cation-exchangeable group;

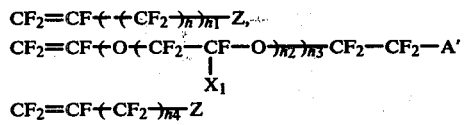

Z=—CN, —COF, —COOH, —COOR$_1$, —COOM or —CONR$_2$R$_3$
R$_1$=C$_1$-C$_{10}$ alkyl group;
R$_2$, R$_3$=H, or R$_1$;
M=alkali metal;
A′=—SO$_2$X′, —COX′;
X′=F or —OY;
Y=H, M, NH$_4$, or R$_1$;
X$_1$=F, —CH$_3$ or —CF$_2$—O—CH$_3$
h=2 to 12;
h$_1$=0 or 1; h$_2$=0 or 1 to 5; h$_3$=0 or 1;
h$_4$=1 to 5.

Monomers which do not have a cation-exchangeable group or a functional group convertible to a cation-exchangeable group and can be copolymerized with the above monomers:

CF$_2$=CF$_2$
CF$_2$=CF—CF$_3$
CF$_2$=CF—O+CF$_2$—CF—O$\frac{}{i}$R$_f$
          |
          X$_1$ CF$_2$=CF—C—R$_f'$
         ‖
         O R$_f$ = —C$_6$F$_5$, —CF$_2$X″
X$_1$ = —F, —CF$_3$, —CF$_2$—O—CF$_3$;
X″ = —F or C$_1$-C$_5$ perfluoroalkyl group
R$_f'$ = C$_1$-C$_5$ perfluoroalkyl group i = 0 or 1 to 5.
CF$_3$NO

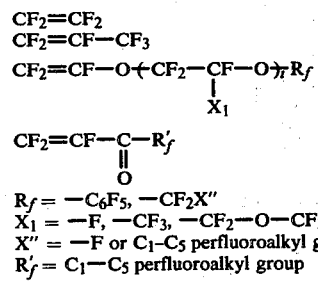

Suitable typical fluorinated monomers include

A group:
CF$_2$=CF—O—CF$_2$—CF$_2$—SO$_2$F;
CF$_2$=CF—O—CF$_2$—CF—O—CF$_2$—CF$_2$—SO$_2$F;
                    |
                    CF$_3$
CF$_2$=CF—O—CF$_2$—CF—O—CF$_2$—CF—O—CF$_2$—CF$_2$—SO$_2$F;
                    |              |
                    CF$_3$          CF$_3$
CF$_2$=CF—CF$_2$—CF$_2$—SO$_2$F;
CF$_2$=CF—O—CF$_2$—CF—O—CF$_2$—CF$_2$—SO$_2$F
                    |
                    CF$_2$
                    |
                    O—CF$_3$ B group:
CF$_2$=CF—O—CF$_2$—CF$_2$—COF;
CF$_2$=CF—O—CF$_2$—CF$_2$—CF$_2$—COF;
CF$_2$=CF—O—CF$_2$—CF$_2$—CF$_2$—CF$_2$—COOCH$_3$
CF$_2$=CF—O—CF$_2$—CF—O—CF$_2$—CF$_2$—COF;
                    |
                    CF$_3$
CF$_2$= CF—COOCH$_3$;
CF$_2$=CF—O—CF$_2$—CF$_2$—CF$_2$—COOCH$_3$ C group:
CF$_2$=CF—CF$_3$;
CF$_2$=CF—O—CF$_3$;
CF$_2$=CF—O—CF$_2$—CF$_3$;
CF$_2$=CF$_2$
CF$_2$=CF—O—CF$_2$—CF$_2$—CF$_3$ The monomers in A group are used for introducing sulfonic acid groups. The monomers in B group are used for introducing carboxylic acid groups. The monomers in C group are used for copolymerization with the monomer in A group and/or B group.

The other cation-exchange membranes used in the present invention are prepared by the impregnation method.

The followings are typical examples for preparing the cation-exchange membranes by the impregnation method.

(1) One or more monomer in B group with or without the monomer in C group are absorbed into the sulfonic acid type cation-exchange membrane and are polymerized and hydrolyzed to introduce carboxylic acid groups.

Suitable monomers in B group include

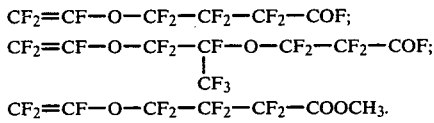

Suitable monomers in C group include $CF_2=CF_2$;

$CF_2=CF-O-CF_3$.

The cation-exchange capacity of the membrane is usually 0.1 to 4 meq/g preferably 0.5 to 2 meq/g dry resin as carboxylic acid groups; and 0.4 to 1.1 meq/g preferably 0.4 to 0.9 meq/g dry resin as sulfonic acid group.

(2) One or more monomer in A group with or without the monomer in C group are absorbed into the carboxylic acid type cation-exchange membrane and are polymerized and hydrolyzed to introduce sulfonic acid groups.

Suitable monomers in A group include

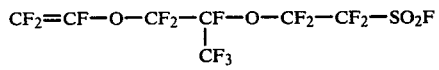

Suitable monomers in C group include

The cation-exchange capacity of the membrane is usually 0.1 to 4 meq/g preferably 0.5 to 2 meq/g dry resin as carboxylic acid groups and 0.4 to 1.1 meq/g preferably 0.4 to 0.9 meq/g dry resin as sulfonic acid groups.

These cation-exchange membranes can be reinforced with reinforcing materials such as glass fiber cloth, and polyester fiber cloth, fluorinated polymer fiber cloth for improving characteristics of the membrane. In the preparation of the reinforced membrane, the cloth can be inserted before or after the polymerization of the fluorinated monomers.

The method of improving the characteristics of the cation-exchange membrane of the present invention comprises swelling the membrane with a water miscible organic solvent and removing the solvent from the membrane and then treating the membrane with hydrochloric acid.

The water miscible organic solvents used in the treatment of the present invention should swell the membrane treated and have a solubility in water more than 0.1 g/100 g $H_2O$ and are preferably the organic solvents which rapidly swell the membrane and are easily vaporized so as to be removed from the membrane.

Suitable water miscible organic solvents include aliphatic monohydric alcohols such as methanol, ethanol, propanol, butanol; ketones such as acetone, methyl ethyl ketone, diethyl ketone; esters such as methyl acetate, ethyl acetate, propyl acetate; ethers such as ethyl ether, propyl ether, tetrahydrofuran, dioxane and chloroform.

The organic solvents can be used as mixtures. The solvent mixture can contain another solvent which swells the membrane but does not improve the characteristics of the membrane such as water.

In the swelling operation, the membrane is dipped in the water miscible organic solvent so as to be swollen. The condition is not limited and can be the temperature from 0° C. to the boiling point of the solvent.

The time for swelling the membrane with the solvent is usually in a range of about 20 minutes to 30 hours. It is possible to shorten the time for the treatment by heating the solvent.

In the solvent removing operation, the membrane impregnating the organic solvent can be removed by heating or drying under a gas flow of air, nitrogen gas or other inert gas, drying in vacuum or other conventional processes at room temperature to 95° C.

It is preferable to remove the organic solvent by evaporating it under heating so as to complete the annealing of the membrane.

It is especially preferable to hold the membrane impregnating the organic solvent between a pair of glass plates with or without wiping out the surface of the membrane and then to evaporate it under heating the swollen membrane so as to complete the annealing of the membrane and to hold the shape of the membrane without deformation.

The heat treatment for removing the organic solvent can be in a range of higher than the room temperature to 95° C. because when it is too high, the electric resistance of the membrane may be increased.

The time for heating the membrane is usually in a range of about 10 minutes to 30 hours.

In the heat treatment, the membrane swollen with the water miscible organic solvent is preferably held between a pair of plates such as glass plate, polytetrafluoroethylene plates, stainless steel plates, though it can be treated in hot air flow.

The resulting membrane is treated with hydrochloric acid.

The concentration of hydrochloric acid is usually in a range of 0.05 N to 10 N preferably 0.5 N to 8 N.

The temperature for the treatment is usually in a range of 40° to 95° C. preferably 60° to 80° C.

The reason why the characteristics of the cation-exchange membrane are improved by the method of the present invention is not clear, however, it is considered as follows.

The fluorinated polymers having no functional group are water-repellent and oil-repellent. The bases of the membrane may have the tendency of water-repellent and oil-repellent. However, the cation-exchangeable groups are bonded in the fluorinated polymer and have high affinity to water so as to bond water molecules around the cation-exchangeable groups. The swelling of the membrane of the fluorinated polymer is caused by the effect of the cation-exchangeable groups.

After swelling the membrane, the water miscible organic solvent is preferably removed by evaporating the organic solvent. The cation-exchangeable groups of the membrane are highly affected by the evaporation of the water miscible organic solvent so as to reduce the permeability of hydroxyl group ions.

This phenomenon can be understood from the fact that this effect can not be attained by a vacuum drying.

However, it is considered to remain strain in the membrane by the treatment and the strain in the membrane may be eliminated by the treatment of hydrochloric acid.

The mechanism is only for the purpose of illustration and the present invention will not be limited by the illustration.

In the examples, an electric resistance of a membrane was measured by AC bridge method (1000 c/s) at 25° C. in 2% aqueous solution of sodium hydroxide.

A transport number of the membrane was calculated from Nernst's equation by measuring the potential of the membrane given between 0.5 N-NaOH and 2.5 N-NaOH.

The present invention will be further illustrated by certain examples.

EXAMPLE 1

A cation-exchange membrane having a thickness of 0.25 mm and a structure

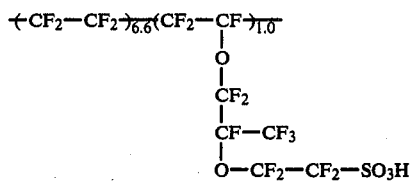

was used.

The cation-exchange membrane can be prepared by copolymerizing tetrafluoroethylene and a monomer

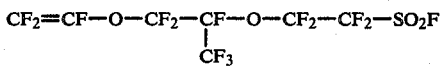

and molding the resulting copolymer and hydrolyzing it.

The cation-exchange membrane was dipped into ethanol at the room temperature for 24 hours to swell it.

The membrane was held between a pair of glass plates and ethanol in the membrane was removed by heating it at 85° C. for 20 hours.

The membrane was treated in 3.3 N-HCl at 65° C. for 3 hours and then, it was kept at the room temperature for one day and it was dipped in 0.5 N-NaOH for 10 days.

The cation transport number of the treated membrane was 93% and the electric resistance of the treated membrane was 2.1Ωcm².

On the other hand, the cation transport number and the electric resistance of the non-treated membrane were respectively 89% and 3.0Ωcm².

EXAMPLE 2

A teflon fiber-reinforced cation-exchange membrane having two layers of A and B was used.
A layer: thickness of 0.05 mm structure

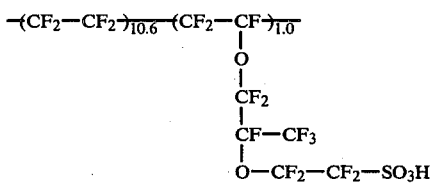

B layer: thickness of 0.10 mm structure

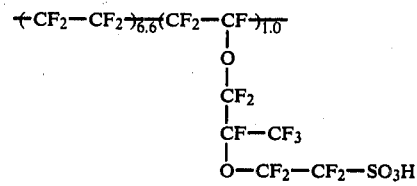

The teflon fiber reinforced cation-exchange membrane was dipped in methanol at the room temperature for 24 hours to swell it.

The membrane was held between a pair of glass plates and heated at 80° C. for 15 hours. The membrane was treated in 3.0 N-HCl at 65° C. for 3 hours and then, it was kept at the room temperature for one day and it was dipped in 0.5 N-NaOH for 10 days.

The cation transport number of the treated membrane was 95% and the electric resistance of the treated membrane was 4.5Ωcm².

On the other hand, the cation transport number and the electric resistance of the non-treated membrane were respectively 93% and 6.5Ωcm².

EXAMPLE 3

The cation-exchange membrane used in Example 2 was dipped in an aqueous solution of sodium hydroxide to convert the acid type to Na-type cation-exchange membrane.

In accordance with the process of Example 2 except using the Na-type cation-exchange membrane, the membrane was treated.

The cation transport number and the electric resistance of the treated membrane were respectively 95% and 4.7 Ωcm².

EXAMPLE 4

The cation-exchange membrane used in Example 2 was dipped in methanol at the room temperature for 1 hour to swell it.

The membrane was held between a pair of glass plates and heated at 80° C. for 2 hours. The membrane was treated in 7 N-HCl at 70° C. for 2 hours and then, it was kept at the room temperature for one day and it was dipped in 0.5 N-NaOH for 10 days.

The cation transport number and the electric resistance of the treated membrane were respectively 97% and 6.3Ωcm².

EXAMPLE 5

The cation-exchange membrane used in Example 1 was dipped in tetrahydrofuran at the room temperature for 24 hours to swell it, and then, the solvent was removed from the membrane in vacuum. The membrane was treated in 4.5 N-HCl at 65° C. for 2 hours and then, it was kept at the room temperature for one day and it was dipped in 0.5 N-NaOH for 10 days.

The cation transport number and the electric resistance of the treated membrane were respectively 90% and 1.8Ωcm².

REFERENCE 1

The cation-exchange membrane used in Example 1 was dipped in benzene at the toom temperature for 24 hours to swell it and then, the solvent was removed from the membrane in vacuum. The membrane was treated in 4.5 N-HCl at 65° C. for 2 hours and then, it was kept at the room temperature for one day and it was dipped in 0.5 N-NaOH for 10 days.

The cation transport number and the electric resistance of the treated membrane were respectively 84% and 2.3Ωcm².

EXAMPLE 6

In accordance with the process of Example 1 except using chloroform instead of methanol, the cation-exchange membrane was treated.

The cation transport number and the electric resistance of the treated membrane were respectively 93% and 2.2Ωcm².

EXAMPLE 7

In accordance with the process of Example 1 except using ethyl acetate instead of methanol, the cation-exchange membrane was treated.

The cation transport number and the electric resistance of the treated membrane were respectively 92% and 2.3Ωcm².

EXAMPLE 8

A membrane having a thickness of 7 mils and a structure $$+CF_2-CF_2\xrightarrow{}_{7.5}-(CF_2-CF)_{1.0}$$
$$\phantom{+CF_2-CF_2-CF_2-CF_2-}\big|$$
$$\phantom{+CF_2-CF_2-CF_2-CF_2-}O$$
$$\phantom{+CF_2-CF_2-CF_2-CF_2-}\big|$$
$$\phantom{+CF_2-CF_2-CF_2-CF_2-}CF_2$$
$$\phantom{+CF_2-CF_2-CF_2-CF_2-}\big|$$
$$\phantom{+CF_2-CF_2-CF_2-CF_2-}CF-CF_3$$
$$\phantom{+CF_2-CF_2-CF_2-CF_2-}\big|$$
$$\phantom{+CF_2-CF_2-CF_2-CF_2-}O-CF_2-CF_2-SO_2F$$

was prepared by copolymerizing tetrafluoroethylene and a monomer $$CF_2=CF-O-CF_2-\underset{\underset{CF_3}{|}}{CF}-O-CF_2-CF_2-SO_2F$$

and molding the resulting copolymer.

One surface of the film was treated with ethylenediamine. The thickness of the ethylenediamine treated layer was measured by a coloring test to find 1.5 mils.

The membrane was reinforced with polytetrafluoroethylene fiber and hydrolyzed to form a cation-exchange membrane.

The cation-exchange membrane was dipped in methanol at the room temperature for 20 minutes to swell it.

The membrane was held between a pair of glass plates and heated at 80° C. for 1 hour. The membrane was treated in 3.3 N-HCl at 65° C. for 2 hours and then, it was kept at the room temperature for one day and it was dipped in 0.5 N-NaOH for 10 days.

The cation transport number and the electric resistance of the treated membrane were respectively 99% and 9.5Ωcm².

On the other hand, the cation transport number and the electric resistance of the non-treated membrane were respectively, 95% and 11Ωcm².

EXAMPLE 9

The cation-exchange membrane used in Example 8 was dipped in methanol at 65° C. for 3 hours to swell it, and then, the solvent was removed from the membrane in vacuum. The membrane was treated in 1.2 N-HCl at 75° C. for 2 hours and then, it was kept at the room temperature for one day and it was dipped in 0.5 N-NaOH for 10 days.

The cation transport number and the electric resistance of the treated membrane were respectively 99% and 8.0Ωcm².

EXAMPLE 10

A copolymer was produced by copolymerizing $$CF_2=CF_2,$$
$$CF_2=CF-O+CF_2\xrightarrow{}_3-COOCH_3 \text{ and}$$
$$CF_2=CF-O-CF_2-\underset{\underset{CF_3}{|}}{CF}-O-CF_2-CF_2-SO_2F$$

was fabricated and hydrolyzed to form a sulfonic acid-carboxylic acid type cation-exchange membrane (thickness of 0.19 mm; a cation exchange capacity of sulfonic acid group of 0.65 meq/g dry resin and a cation exchange capacity of carboxylic acid group of 0.31 meq/g dry resin).

The cation-exchange membrane was dipped in methanol at the room temperature for 1 hour to swell it.

The membrane was held between a pair of glass plates and heated at 85° C. for 20 hours.

The membrane was treated in 3.5 N-HCl at 65° C. for 2 hours and then, it was kept at the room temperature for one day and it was dipped in 0.5 N-NaOH for 10 days.

The cation transport number and the electric resistance of the treated membrane were respectively 97% and 3.1Ωcm².

On the other hand, the cation transport number and the electric resistance of the non-treated membrane were respectively 95% and 4.8Ωcm².

EXAMPLE 11

In an autoclave, the cation-exchange membrane used in Example 1 and perfluorovinyl propyl ether were charged and azobisisobutyronitrile was added as an initiator and then tetrafluoroethylene was added and they were polymerized to obtain a cation-exchange membrane.

The cation-exchange membrane was dipped in methanol at the room temperature for 24 hours to swell it.

The membrane was held between a pair of glass plates and heated at 80° C. for 24 hours. The membrane was treated in 3.3 N-HCl at 65° C. for 3 hours and then, it was kept at the room temperature for one day and it was dipped in 0.5 N-NaOH for 10 days.

The cation transport number and the electric resistance of the treated membrane were respectively 95% and 3.2Ωcm².

On the other hand, the cation transport number and the electric resistance of the non-treated membrane were respectively, 94% and 5.4Ωcm².

REFERENCE 2

Styrene-divinyl benzene strong acidic type cation-exchange resin (Trade name Amberlite IR120B manufactured by Rhom & Haas) was pulverized to be fine powder (about 300 mesh).

The cation-exchange resin powder was mixed with polyvinyl fluoride powder at a ratio of 7:3 by weight and they were kneaded with a small amount of dimethylformamide and the mixture was pressed under heating to form a non-homogeneous cation-exchange membrane.

The electric resistance and the cation transport number of the membrane were respectively, 5.2Ωcm² and 78%.

Then the non-homogeneous cation-exchange membrane was dipped into ethanol for 24 hours to swell it. The membrane was held between a pair of glass plates and heated at 80° C. for 20 hours. The membrane was treated in 3.5 N-HCl at 65° C. for 3 hours and then, it was kept at the room temperature for one day and it was dipped in 0.5 N-NaOH for 10 days.

The cation transport number and the electric resistance of the treated membrane were respectively 76% and 4.8Ωcm².

REFERENCE 3

The cation-exchange membrane used in Example 1 which was not treated with a solvent, was treated in 3.3 N-HCl in accordance with the process of Example 1.

The cation transport number and the electric resistance of the treated membrane were respectively 81% and 2.0Ωcm².

REFERENCE 4

The cation-exchange membrane used in Example 1 was held between a pair of glass plates and heated at 80° C. for 24 hours and then, the membrane was treated in 3.3 N-HCl in accordance with the process of Example 1.

The cation transport number and the electric resistance of the treated membrane were respectively 83% and 2.4Ωcm².

REFERENCE 5

The cation-exchange membrane used in Example 1 treated at the room temperature in vacuum for 30 hours and the membrane was treated in accordance with the process of Example 1.

The cation transport number and the electric resistance of the treated membrane were respectively 82% and 2.2Ωcm².

EXAMPLE 12

Tetrafluoroethylene and $$CF_2=CF-O-(CF_2)_3-COOCH_3$$

were copolymerized and the copolymer was press-molded to form a membrane and the membrane was hydrolyzed to obtain a carboxylic acid type cation exchange membrane (thickness: 0.2 mm; cation-exchange capacity: 1.2 meq/g dry resin).

The cation exchange groups of the membrane were converted to salt type.

The membrane was dipped in methanol for 1 hour and held between a pair of plates and heated at 80° C. for 5 hours. The membrane was treated in 3.3 N-HCl at 65° C. for 1 hour and then, it was kept at the room temperature for one day and it was dipped in 0.5 N-NaOH for 10 days.

The cation transport number and the electric resistance of the treated membrane were respectively 97% and 4.2Ωcm².

On the other hand, the cation transport number and the electric resistance of the non-treated membrane were respectively 94% and 5.3Ωcm².

EXAMPLE 13

An electrolytic cell having 30×30 cm of effective area was prepared by using the non-treated cation-exchange membrane of Example 2 as the diaphragm for partitioning an anode compartment and a cathode compartment.

In an electrolysis of an aqueous solution of sodium chloride to obtain sodium hydroxide, the characteristics of the membrane were deteriorated as follows because of a trouble.

|  | Cation transport number (%) | Electric resistance (Ω cm²) |
|---|---|---|
| Before trouble | 93 | 6.5 |
| After trouble | 87 | 9.6 |

The membrane (after trouble) was dipped in methanol at the room temperature for 30 minutes and was held between a pair of glass plates and heated at 80° C. for 20 hours.

The membrane was treated in 3.5 N-HCl at 65° C. for 2 hours and then, it was kept at the room temperature for one day and it was dipped in 0.5 N-NaOH for 10 days.

The cation transport number and the electric resistance of the treated membrane were respectively 94% and 6.6Ωcm².

The recovery was complete. What is claimed is:

1. A method of improving characteristic of a cation-exchange membrane which comprises swelling a homogeneous cation-exchange membrane made of one or more fluorinated polymer having cation-exchangeable groups with a water miscible organic solvent and then removing said organic solvent from the swollen membrane and then, treating the membrane with hydrochloric acid at from 40° to 95° C.

2. A method according to claim 1, wherein said cation-exchange membrane is made of one or more fluorinated polymer having cation-exchangeable groups of sulfonic acid groups and/or carboxylic acid groups or salts thereof.

3. A method according to claim 1 wherein the swelling treatment of the cation-exchange membrane with the solvent is carried out by dipping the cation-exchange membrane having free acid type cation-exchange groups or the cation-exchange membrane having monovalent metal salt or ammonium salt type cation-exchange groups.

4. A method according to claim 1, wherein said organic solvent is removed from the swollen membrane while holding said membrane between a pair of plates and evaporating said organic solvent.

5. A method according to claim 1, wherein said water miscible organic solvent is selected from the group consisting of aliphatic monohydric alcohols, ketones, esters, ethers and chloroform which is miscible to water at least 0.1 g/100 g H₂O of solubility and swells the membrane treated.

6. A method according to claim 1, wherein said water miscible organic solvent is methanol, ethanol, propanol or butanol.

7. A method according to claim 1, wherein said water miscible organic solvent is a lower alkyl acetate, tetrahydrofuran, or chloroform.

8. A method according to claim 1, wherein the treatment with hydrochloric acid is carried out in hydrochloric acid at a concentration of 0.05 N to 10 N.

9. A method according to claim 1, wherein the treatment with hydrochloric acid is carried out at 60° to 80° C.

10. A method according to claim 1, wherein the characteristic of a salt type cation-exchange membrane used for an electrolysis is recovered.

* * * * *